A. W. POOLE.
WORMING TOOL.
APPLICATION FILED FEB. 7, 1910.
972,237.
Patented Oct. 11, 1910.
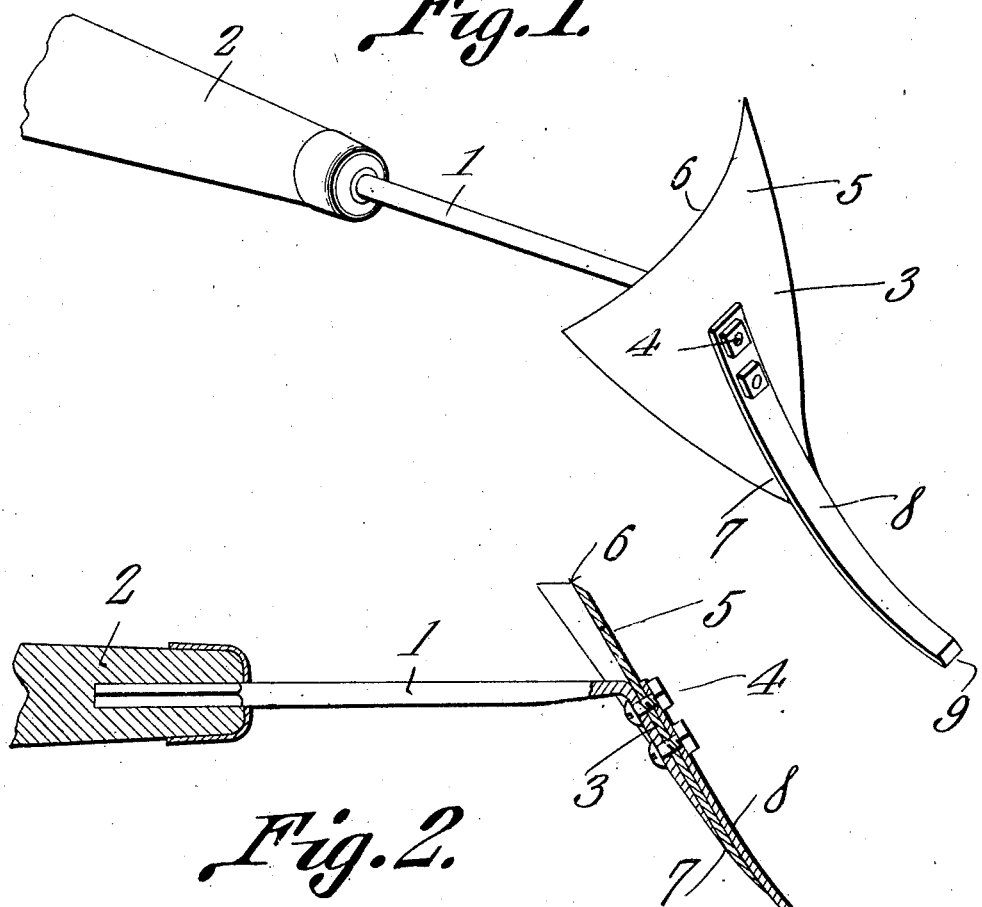
Alfred W. Poole, Inventor
Witnesses
By C. A. Snow & Co.
Attorneys

UNITED STATES PATENT OFFICE.

ALFRED W. POOLE, OF OZARK, ARKANSAS.

WORMING-TOOL.

972,237. Specification of Letters Patent. Patented Oct. 11, 1910.

Application filed February 7, 1910. Serial No. 542,527.

*To all whom it may concern:*

Be it known that I, ALFRED W. POOLE, a citizen of the United States, residing at Ozark, in the county of Franklin and State of Arkansas, have invented a new and useful Worming-Tool, of which the following is a specification.

This invention has relation to worming tools and it consists in the novel construction and arrangement of its parts as hereinafter shown and described.

The object of the invention is to provide a pintle and an effective tool adapted to be used about the roots and trunks of trees for removing and destroying worms, borers, etc. The parts of the tool are so assembled and shaped that the soil may be readily removed from around and under the roots even though they be intertwined without injury to the roots. The tool is provided with means whereby the shoots may be easily cut from the trunk of the tree in close proximity to the same without injury.

With the above object in view, the structure includes an approximately triangular blade mounted upon a handle at an angle of approximately seventy degrees. In a direction transversely of the handle and at its rear portion the said blade is concaved with respect to the handle and at its forward portion the said blade is convexed with relation to the handle the said convexity lying in the vertical plane of the handle. A chisel is mounted on the forward portion of the blade and is secured to the same by the securing devices which attach the blade to the handle. The said chisel is convexed longitudinally.

In the accompanying drawing: Figure 1 is a perspective view of the tool. Fig. 2 is a vertical sectional view of the same.

The tool includes a shank 1 which is attached to a handle 2 in the usual manner. An approximately triangular blade 3 is fixed to the forward portion of the shank 1 by means of rivets or securing devices 4 and the said blade 3 is pitched at an angle approximately seventy degrees to the axis of the shank 1.

The upper rear portion 5 of the blade 3 is concaved with relation to the shank 1 and handle 2 and the upper portion of the blade terminates in a cutting edge 6 which is also concave. The lower forward portion of the blade 3 is convexed at 7 with relation to the shank 1 and handle 2. The convex portion 7 terminates at the lower pointed end of the blade 3. A longitudinally convex chisel 8 rests upon the forward surface of the blade 3 and is secured to the said blade by securing devices 4 which connect the blade with the shank 1. The chisel 8 lies approximately in the same vertical plane as that in which the axis of the shank lies. The chisel 8 is provided at its forward end with a cutting edge 9.

In operation, either one of the upper rear corners of the blade 3 may be used for digging into the soil around the trunk of a tree and loosening the same. The loosened soil may be drawn away from the tree trunk by the convex portion 5 of the blade and when the upper portions of the roots of the trees have been laid bare the chisel 8 may be worked around and under the roots for loosening the soil. As the soil under the roots is loosened it may be picked out by using the end of the chisel 8 and thus it is possible to remove the soil from under the roots in the vicinity of the trunk without disturbing the extremities of the roots. Therefore it will be seen that the worms and borers which usually attack trees at or just below the surface of the soil may be reached and destroyed without disturbing the position of the roots of the trees in the soil. Furthermore the sharpened end of the chisel 8 may be used for cutting shoots away from the tree trunks and also for making incisions into the tree trunks for the purpose of destroying borers.

Having described the invention what I claim as new and desire to secure by Letters-Patent is:

1. A worming tool comprising a shank, an approximately triangular blade attached to the shank, a chisel member mounted upon the forward side of the blade and concaved longitudinally and terminating in a cutting edge, and securing devices passing transversely through the shank, the blade and the chisel member.

2. A worming tool comprising a shank, an approximately triangular blade attached to the shank and disposed at an acute angle to the axis thereof, said blade having an upper rearwardly disposed cutting edge, a longitudinally convexed chisel member applied to the forward surface of the blade and terminating in a cutting edge and securing devices passing transversely through the shank, the blade and the chisel member.

In testimony that I claim the foregoing as my own, I have hereto affixed my signature in the presence of two witnesses.

ALFRED W. POOLE.

Witnesses:
W. L. HUGGINS,
T. C. MOORE.